No. 758,174. PATENTED APR. 26, 1904.
F. B. COREY.
AIR BRAKE CONTROLLING VALVE.
APPLICATION FILED NOV. 20, 1903.
NO MODEL. 2 SHEETS—SHEET 1.

Witnesses:
Robt. L. Chapman
Helen A. Ford

Inventor.
Fred B. Corey.
by Albert G. Davis
Att'y.

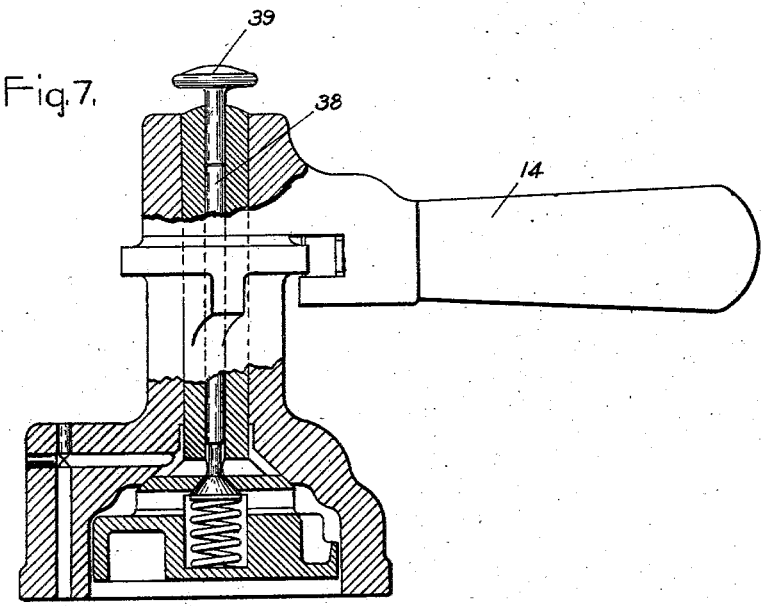
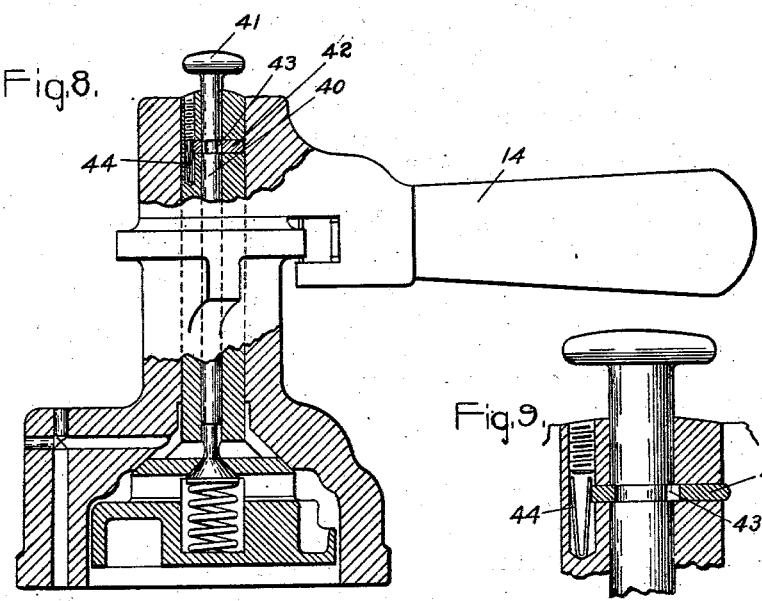

No. 758,174. Patented April 26, 1904.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

AIR-BRAKE CONTROLLING-VALVE.

SPECIFICATION forming part of Letters Patent No. 758,174, dated April 26, 1904.

Application filed November 20, 1903. Serial No. 182,035. (No model.)

*To all whom it may concern:*

Be it known that I, FRED B. COREY, a citizen of the United States, residing at Schenectady, county of Schenectady, State of New York, have invented certain new and useful Improvements in Air-Brake Controlling-Valves, of which the following is a specification.

My invention relates to air-brake controlling-valves such as are employed in air-brake systems for controlling the passage of air to and from the train-pipe in the operation of the brake mechanism, and it has reference particularly to valves of this type which are provided with an auxiliary valve mechanism for controlling the flow of compressed air to some device independent of the air-brake system, such as a track-sander or pneumatic signal. Where such valves are left exposed, as is common in street-railway practice where both ends of the car are provided with duplicate equipments, it becomes necessary to provide some means for preventing the operation of the valve mechanism by unauthorized persons. This is usually done in the case of the main controlling-valve by providing a removable handle, which the operator takes with him on leaving the valve.

The principal object of the present invention is to provide a controlling-valve of this type with certain improvements designed to prevent any unauthorized use of the auxiliary valve; and to this end my invention comprises certain features, among which may be mentioned the following: first, auxiliary valve-operating mechanism which extends up through the main-valve stem; second, a removable push-button on the end of the main-valve stem for operating the auxiliary valve; third, means for rendering the auxiliary valve inoperative to control its passage whenever the operating-lever of the main controlling-valve is removed, and, fourth, means for rendering the auxiliary valve inoperative to control its passage when the main valve is in "lap" position.

Still other objects and features of my invention will be apparent from the following detailed description, taken in connection with the accompanying drawings, in which I have illustrated different embodiments of my invention.

Figure 1:
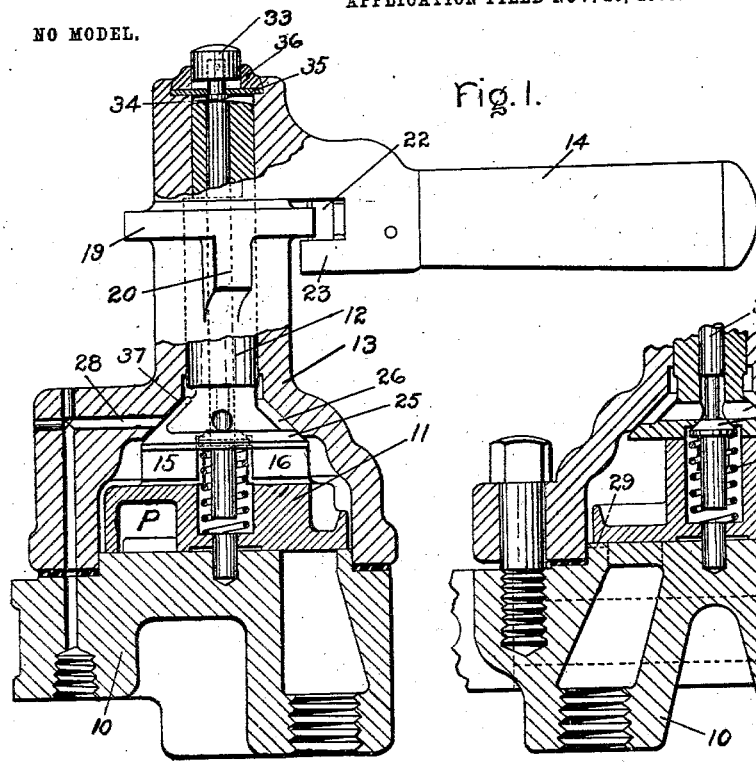
Figure 2:
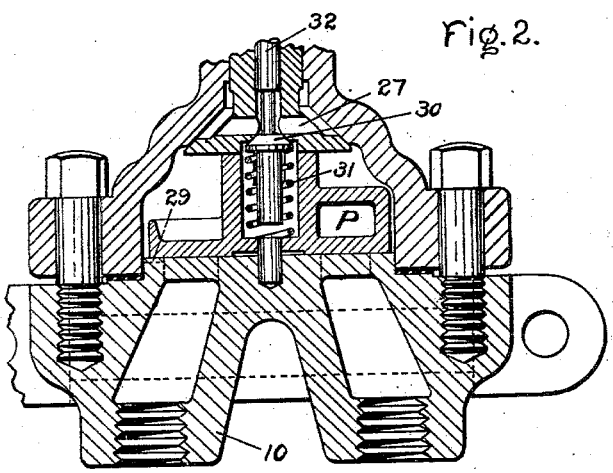
Figure 3:
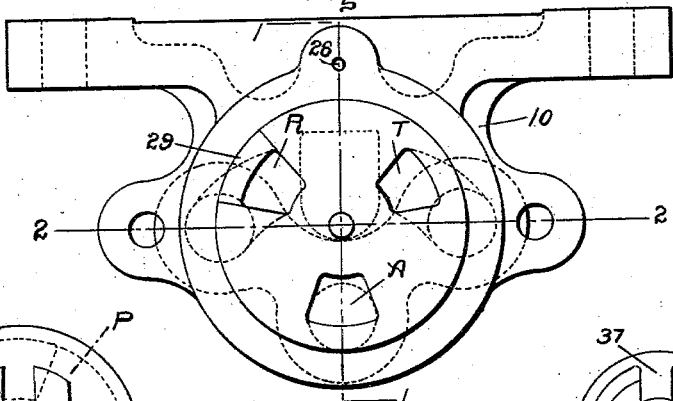
Figure 4:
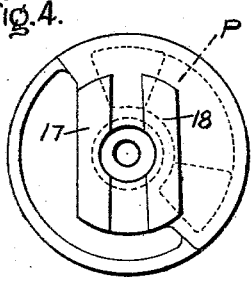
Figure 6:
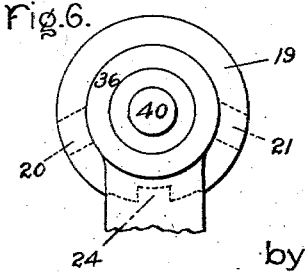
Figure 5:
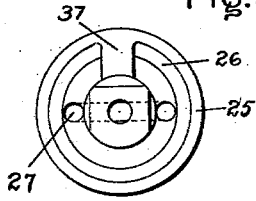

In the drawings, Figure 1 is a partial vertical section of a controlling-valve for so-called "straight" air-brake systems embodying the features of my invention, the section being taken on the line 1 1 of Fig. 3. Fig. 2 is a fragmentary section taken on the line 2 2 of Fig 3. Fig. 3 is a plan view of the valve-body. Fig. 4 is a plan view of the main controlling-valve. Fig. 5 is a similar view of the main-valve stem. Fig. 6 is a plan view of a portion of the main-valve-controlling lever and the valve-bonnet. Figs. 7 and 8 are views similar to Fig. 1, illustrating modifications, and Figs. 9 and 10 are detail views of the latch mechanism employed in the modification shown in Fig. 8.

Throughout the several figures like characters refer to like parts.

The particular controlling-valve in connection with which I have chosen to illustrate the various features of my invention consists, essentially, of a base 10, a rotary valve 11, resting upon the upper face of said base, a valve-stem 12, interlocking with said rotary valve, a bonnet 13 for inclosing said valve and stem, and an operating-lever 14, removably secured to the upper end of said stem. The base 10 is provided with main-reservoir, atmosphere, and train-pipe ports R A T, which are adapted to coöperate with the bridged port P in the rotary valve 11 to establish connection between the train-pipe and either the main reservoir or atmosphere. The rotary valve 11 is given the necessary movements to establish said connections by the stem 12, which is provided on its lower end with lugs 15 16, adapted to fit between the coöperating lugs 17 and 18 on the upper face of the rotary valve. As is usual in valves of this type, the bonnet is provided with a flange 19 and stops 20 21, which coöperate with the spring-pressed pawl 22 and the projection 23 on the operating-lever to indicate to the operator the various operative positions of the main valve. In addition to limiting the movement of the operating-lever by engagement with the stops 20 21 the projection 23 by engaging the under side of the flange 19 prevents the removal of the operating-lever at all times when the main valve is not in lap position. When this position of the main valve is reached, the notch 24 in the flange 19 registers with the projection 23 and permits the ready removal of the operating-lever.

Referring now to the auxiliary valve construction, it will be noted that the lower end of the main-valve stem 12 is provided with a rib 25, which is adapted to engage a coöperating surface on the interior of the valve-bonnet to establish an air-tight partition between the main-valve chamber below it and the cavity 26 above it. In the drawings this cavity is in the nature of a groove which extends around the conical face of the lower end of the stem 12. A port 27 extends through the main-valve stem at this point and communicates at its center with the valve-chamber below said stem. The cavity 26 is also adapted to be placed in direct communication with the port 28, which is designed to lead to the sander or other independent pneumatic device to be operated. A groove 29 in the main-valve seat allows compressed air to pass from the main reservoir to the upper side of the rotary valve 11 and for certain positions of the auxiliary valve mechanism through the port 27, the cavity 26, and port 28 to the independent pneumatic device. This passage, however, is normally closed by an auxiliary valve 30, seated in the lower end of the main-valve stem and normally held in closed position by a coiled spring 31. The stem 32 of this auxiliary valve 30 extends upward through an opening in the main-valve stem 12 and in the preferred form of the invention terminates at the upper end of said main-valve stem. The operating-lever 14 is provided with a push-button 33, located directly above the auxiliary-valve stem in such a position that when pressed downward the auxiliary valve will be opened. This push-button is provided with a headed shank 34, which passes through an aperture in a plate 35, held in position in the head of the operating-lever by a ring 36.

Since the auxiliary-valve stem extends to the upper end of the main-valve stem, whenever the operating-lever is removed and the valve is left some means must be provided for preventing the opening of the auxiliary valve by pressing upon the upper end of its stem, as might be readily done with a pencil or sharp instrument. This means consists in the preferred form of a valve 37, extending upward from the rib 25 at the lower end of the main-valve stem and serving to close the port 28 when the main valve is in the lap position and the operating-lever is in a position to be removed.

In order to insure a correct assembly of the main rotary valve 11 and its stem 12, so as to bring the valve 37 over the port 28 when the main valve-ports are lapped, the lugs 15 16 on the lower end of the valve-stem are tapered, so that they can be fitted between the inner tapered faces of the lugs 17 18 of the rotary valve only when the parts are in position to bring about the desired relation.

In the modifications shown in Figs. 7 and 8 the valve 37 is omitted, so that for all positions of the main valve air may be supplied to the auxiliary pneumatic device by simply operating the auxiliary valve. In order to prevent the unauthorized operation of this valve when the attendant is absent and the operating-lever removed, two different arrangements are shown. In the arrangement of Fig. 7 a short auxiliary-valve stem and a removable push-button are employed, and in the arrangement of Fig. 8 the auxiliary-valve stem is latched when the operating-lever of the main valve is removed. In Fig. 7 the auxiliary-valve stem 38 terminates short of the upper end of the main-valve stem and is engaged at its upper end by the lower end of the shank of the push-button 39, which is preferably somewhat longer than the end of the valve-stem, so that the lever cannot be removed without removing the push-button.

In Fig. 8 the auxiliary-valve stem 40 is provided with a button 41, rigidly secured thereto and located above the upper end of the main-valve stem. When the operating-lever is in position, the auxiliary valve is operated by pressing upon the button 41; but when the operating-lever is removed a latch engages the auxiliary-valve stem and prevents its movement. This latch consists, essentially, of a spring-pressed plate 42, located in a lateral recess in the upper end of the main-valve stem, coöperating with a groove 43 in the auxiliary-valve stem, located so as to be opposite the plate when the auxiliary valve is closed. A spring 44 tends to force the plate 42 into the groove 43, but is prevented from doing so when the main-valve operating-lever is in position on the main-valve stem by the outer end of the plate engaging the head of the operating-lever, as clearly shown in Fig. 8. When the operating-lever 14 is removed and the auxiliary valve is closed, the plate 42 will be moved into the notch of the auxiliary-valve stem, as shown in Fig. 9. As there indicated, the outer end of the plate 42 is rounded off, so that when the operating-lever is put in position on the main-valve stem the plate will be forced backward into its non-latching position.

I do not wish to be limited to the specific constructions herein shown, since it is apparent that many alterations and modifications may be made without departing from the spirit of my invention, and I aim to cover by the terms of the appended claims all such alterations and modifications.

What I claim as new, and desire to secure by Letters Patent of the United States, is—

1. The combination with an air-brake controlling-valve having a stem adapted to receive an operating-lever, of an auxiliary valve arranged to control a passage for the supply of air to a device independent of the air-brake system, and operating mechanism for said auxiliary valve extending up through the stem of the main controlling-valve.

2. The combination with an air-brake controlling-valve having a stem adapted to receive an operating-lever, of an auxiliary valve seated in the stem of the main controlling-valve and arranged to control a passage for the supply of air to a device independent of the air-brake system, and operating mechanism for the said auxiliary valve extending up through the stem of the said main controlling-valve.

3. The combination with an air-brake controlling-valve having a stem adapted to receive an operating-lever, of an auxiliary valve, and means for rendering the said auxiliary valve inoperative to control the passage in which it is included when the operating-lever is removed from the stem of the controlling-valve.

4. The combination with an air-brake controlling-valve having a stem adapted to receive an operating-lever, of an auxiliary valve arranged to control a passage for the supply of air to a device independent of the air-brake system, and means for rendering the said auxiliary valve inoperative to control said passage when the operating-lever is removed from the stem of the controlling-valve.

5. The combination with an air-brake controlling-valve having a stem adapted to receive an operating-lever, of an auxiliary valve seated in the stem of the main controlling-valve, and means for rendering the said auxiliary valve inoperative to control the passage in which it is included when the operating-lever is removed from the stem of the controlling-valve.

6. The combination with an air-brake controlling-valve having a stem adapted to receive an operating-lever, of an auxiliary valve seated in the stem of the main controlling-valve and arranged to control a passage for the supply of air to a device independent of the air-brake system, and means for rendering the said auxiliary valve inoperative to control said passage when the operating-lever is removed from the stem of the controlling-valve.

7. The combination with an air-brake controlling-valve having a stem adapted to receive an operating-lever, of an auxiliary valve arranged to control a passage for the supply of air to a device independent of the air-brake system, and a removable push-button on the end of the controlling-valve stem for operating the said auxiliary valve.

8. The combination with an air-brake controlling-valve having a stem adapted to receive an operating-lever, of an auxiliary valve seated in the stem of the main controlling-valve and arranged to control a passage for the supply of air to a device independent of the air-brake system, and a removable push-button on the end of the controlling-valve stem for operating the said auxiliary valve.

9. The combination with an air-brake controlling-valve having a stem adapted to receive an operating-lever, of an auxiliary valve arranged to control a passage for the supply of air to a device independent of the air-brake system, and means for rendering the said auxiliary valve inoperative to control said passage whenever the operating-lever is brought to the lap position.

10. The combination with an air-brake controlling-valve having a stem adapted to receive an operating-lever, of an auxiliary valve arranged to control a passage for the supply of air to a device independent of the air-brake system, and means for closing said passage whenever the operating-lever is brought to the lap position.

11. The combination with an air-brake controlling-valve having a stem adapted to receive an operating-lever, of an auxiliary valve arranged to control a passage for the supply of air to a device independent of the air-brake system, and another valve carried by the stem of the main controlling-valve for closing said passage when the operating-lever is brought to the lap position.

12. The combination with an air-brake controlling-valve having a stem adapted to receive an operating-lever, of an auxiliary valve arranged to control a passage for the supply of air to a device independent of the air-brake system, and operating mechanism for said auxiliary valve extending up through the stem of the said main controlling-handle and terminating in a push-button carried by the operating-lever.

In witness whereof I have hereunto set my hand this 13th day of November, 1903.

FRED B. COREY.

Witnesses:
 BENJAMIN B. HULL,
 HELEN ORFORD.